INVENTOR.
Donald J. Lemens
BY Lee H. Kaiser
Attorney

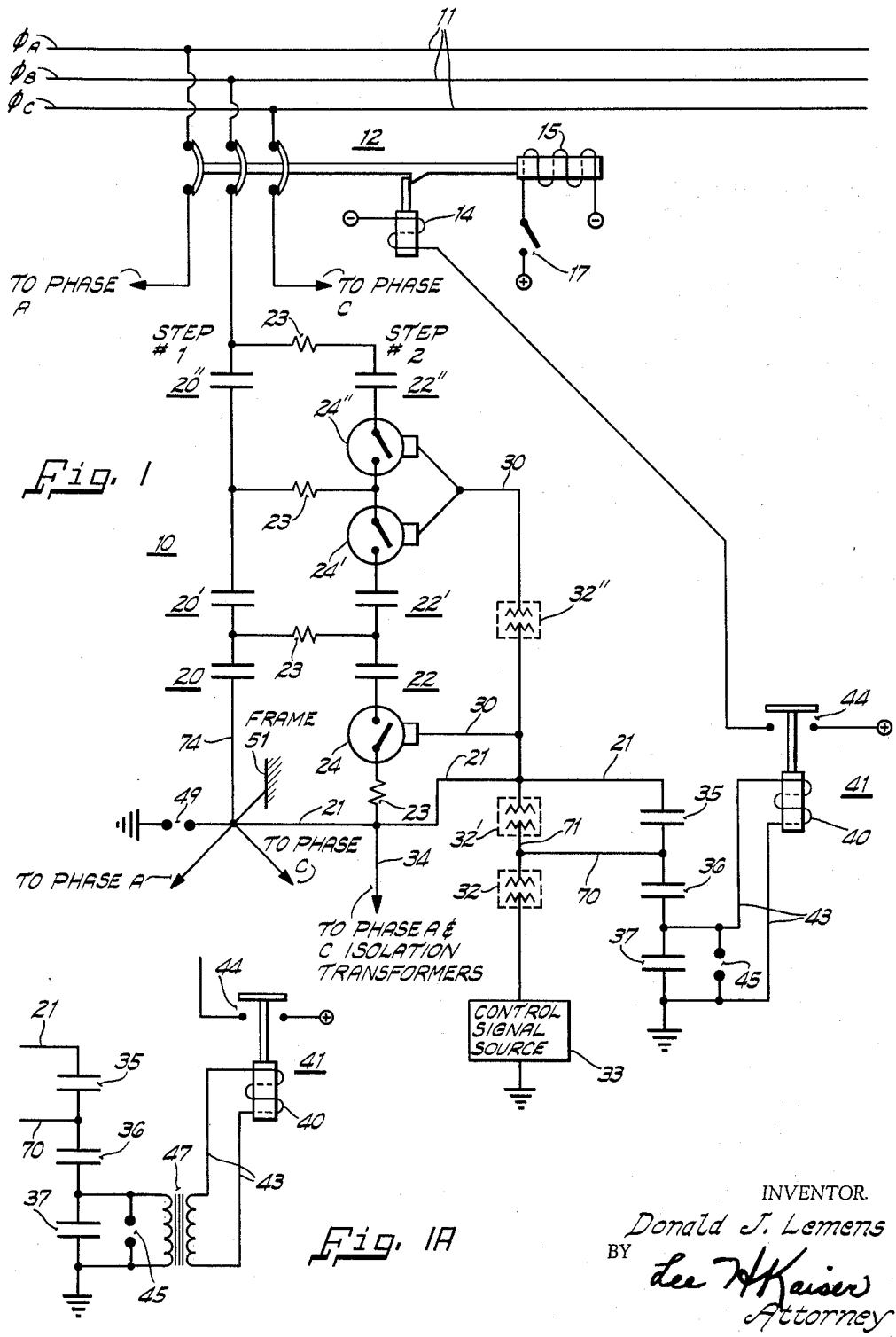

United States Patent Office 3,248,607
Patented Apr. 26, 1966

---

3,248,607
PROTECTIVE ARRANGEMENT FOR SHUNT CAPACITOR BANK
Donald J. Lemens, South Milwaukee, Wis., assignor to McGraw-Edison Company, Milwaukee, Wis., a corporation of Delaware
Filed May 16, 1963, Ser. No. 280,974
7 Claims. (Cl. 317—12)

This invention relates to shunt capacitor banks for alternating current power lines and more particularly to the protection of floating neutral, star capacitor banks.

Power factor correction capacitors are frequently connected in shunt to alternating current distribution and transmission lines. Conventionally the capacitors are connected in groups, each consisting of a plurality of capacitors in parallel, and a plurality of such groups are connected in series. It is customary to provide an individual fuse in series with each capacitor to disconnect it in the event of an internal fault. The impedance of a group increases when one of the fuses of the paralleled capacitors blows with the result that the voltage increases across the group containing the faulted capacitor. Capacitors are usually constructed for continuous operation at a potential not greater than 110% of rated voltage, and it is necessary to provide protective means to prevent a continuous overvoltage of greater than 10% on the remaining energized capacitors in the event that one capacitor fails.

One well known protective arrangement for floating neutral, star capacitor banks utilizes a potential transformer connected between the neutral of the bank and ground. Failure of a capacitor in one phase of the star-connected bank results in unbalance of the impedances of the phases and causes displacement, or shift, of the potential of the neutral with respect to ground. It is industry practice to utilize a potential transformer of the same voltage rating as the power system to insure that it can successfully withstand, without damage, overvoltages resulting from surges on the power system. The relatively high cost of a potential transformer of the power system voltage class makes this protective scheme relatively expensive. It is also industry practice to utilize base insulators, which isolate from ground the metallic framework on which the capacitors are mounted, of the same voltage rating as the power system, thereby increasing the cost of this protective arrangement. An additional disadvantage of this protective scheme is that ferroresonance occasionally occurs during switching and system disturbances between the capacitor bank, the power system, and the potential transformer and may result in transients that damage the capacitor bank. A further disadvantage of this protective arrangement is that on very high voltage systems the signal generated in the secondary of the protective transformer, in the event of unbalance of the bank phases, may not be of sufficient magnitude to be detected by a voltage relay of conventional sensitivity.

It is an object of the invention to provide a neutral unbalance detection protective arrangement for a floating neutral, star capacitor bank which permits reduction of the voltage rating and cost of the unbalance detection means and the base insulators. It is a further object of the invention to provide such a neutral unbalance detection protective arrangement wherein the capacitor bank absorbs surge energy of traveling waves on the power system. Another object is to provide such a protective arrangement which cannot cause transients as a result of ferroresonance and which can be of any desired sensitivity. It is a still further object of the invention to provide such a neutral unbalance detection protective arrangement for a floating neutral star capacitor bank of the type disclosed in U.S. 2,887,647 to Henry H. Strozier, wherein the capacitors utilized for the purpose of distributing the neutral-to-ground voltage uniformly across the isolation transformers are utilized in the unbalance detection means.

These and other objects and advantages of the invention will be more readily apparent from the following detailed description when taken in conjunction with the accompanying drawing wherein:

FIG. 1 is a schematic circuit diagram of a floating neutral, star capacitor bank embodying the invention, only one phase being shown;

FIG. 1A is a partial schematic circuit diagram of an alternative embodiment of the unbalance detecting means of the capacitor bank of FIG. 1;

Figure 3:
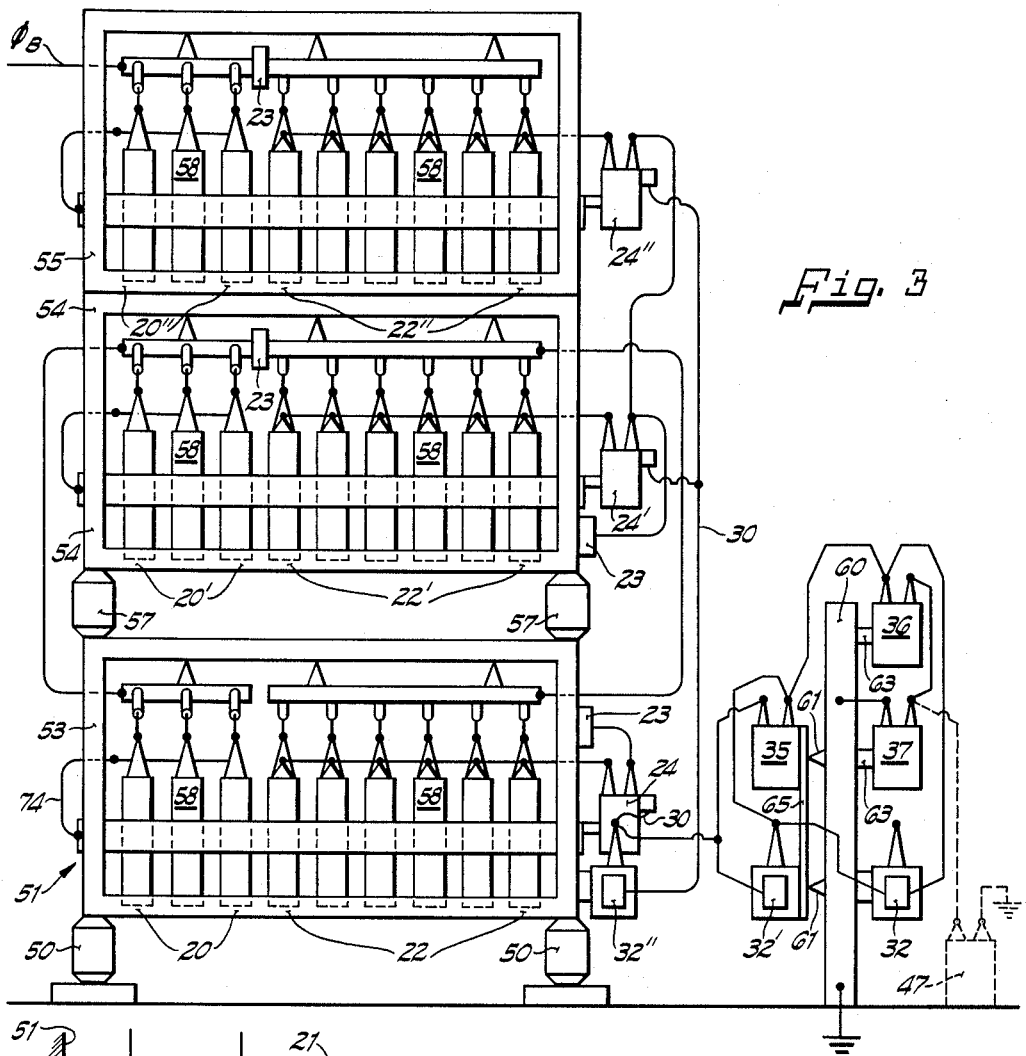
FIG. 3 is an elevation view of one phase of a capacitor bank connected in accordance with FIG. 1.

The preferred embodiment of the invention will be described with reference to a star capacitor bank 10 of the type disclosed in U.S. Patent 2,887,647 to Henry H. Strozier, having the same assignee as the present invention, for a twenty 34.5 kilovolt power system. In a capacitor bank in accordance with the Strozier patent, the first "step" in the capacitor bank is connected to the power system by a conventional circuit breaker, and steps subsequent to the first are connected in parallel to series groups of the first step by relatively inexpensive switches at a potential which is only a fraction of the power system voltage. The term "step" is intended to refer to the capacitors of a bank that are simultaneously connected to a power system. The capacitor bank 10 is of the three phase, high voltage, floating neutral, Y-type which is connected to a three phase alternating current transmission or distribution power line 11 by a circuit breaker 12 having a trip coil 14 and a closing coil 15 which may be controlled manually by a switch 17 or automatically in any desired manner. As illustrated, capacitor bank 10 is adapted to be connected to power system 11 in two steps. The first step of capacitor bank 10 is switched by circuit breaker 12 and includes three groups 20, 20′, and 20″ in each phase connected in series between the corresponding phase conductor $\phi_A$, $\phi_B$ or $\phi_C$ and the neutral 21. Only phase B of capacitor bank 10 is illustrated in order to shorten the description and facilitate the understanding of the invention, but it will be understood that phases A and C of capacitor bank 10 are identical to phase B. Each group 20, 20′, and 20″ may comprise a single capacitor or, as illustrated in FIG. 3, may comprise six paralleled capacitors 58 of 100 kilovar rating so that each phase of step one has 1800 kilovar, and 5400 kilovar of the three phases are switched in the first step. It will be appreciated that the three serially connected groups 20, 20′ and 20″ of the first step comprise a voltage divider.

The second step of capacitor bank 10 comprises three series groups 22, 22′ and 22″ which may be identical to the groups 20, 20′ and 20″ of the first step and comprise six 100 kilovar capacitors 58 in parallel. Thus a total of 1800 kilovars are switched in each phase of the second step, and 5400 kilovars are switched in the second step of capacitor bank 10.

The series groups 22, 22′ and 22″ of the second step are switched by relatively inexpensive voltage switches 24, 24′, and 24″ of the type having latch trip, or snap action contacts (not shown) immersed in an insulting dielectric. A switch suitable for the purposes of the invention is disclosed in U.S. Patent 2,672,141 to William J. Weinfurt entitled, "Switch Operating Means," having the same assignee as the present invention.

Each group 22 of the second step is connected in a series circuit with a corresponding capacitor group 20 of the first step, a current limiting reactor 23, and a relatively low voltage switch 24. The voltage across each group 20 of the first step is only ⅓ of the line-to-neutral voltage of that each switch 24 switches at ⅓ the line-to-neutral voltage and can be of correspondingly lower voltage insulation rating. The switches 24, 24', and 24" in the second step of all of the phases are operated substantially simultaneously to connect the groups 22, 22', and 22" in each phase in series with each other between the corresponding phase conductor $\phi_B$ and the neutral 21. Each switch 24 is operated electrically through a remote control operating coil (not shown) by operating signals sent over leads 30. Each switch 24 is mounted at a potential above ground, and the remote control operating mechanism (not shown) of each switch is insulated to the proper voltage level above ground by cascading 120–120 volt isolating transformers 32, 32', and 32" in the control circuit. The remote control operating coils (not shown) of all switches 24 are actuated simultaneously in response to a signal sent from a 120 volt control source 33 through the cascaded isolating transformers 32, 32' and 32" over leads 30, and the operating signal is transmitted simultaneously to the switches 24, 24', and 24" of phases A and C over lead 34.

Figure 2:
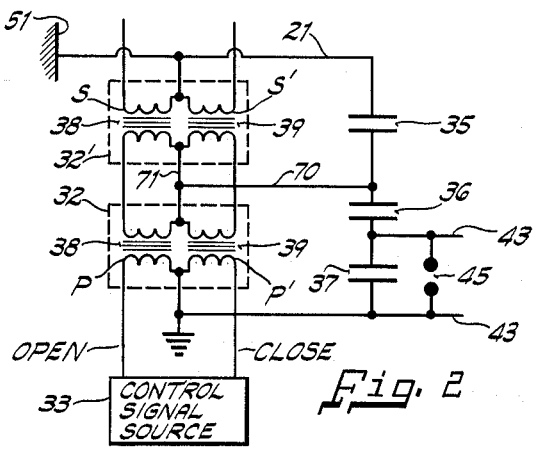
FIG. 2 is a partial schematic circuit diagram of the three-wire system for transmitting "open" and "close" signals through the isolating transformers to the disconnecting switches.

In order to simplify the circuit diagram, FIG. 1 illustrates the control signal circuit through the isolating transformers 32 to the switches 24 as a single-line diagram, i.e., as a single conductor. As shown in FIG. 2, the control signals are actually transmitted over a three-wire circuit and each isolating transformer 32, 32' and 32" has two core and coil assemblies 38 and 39 to permit transmitting of both "open" and "close" signals through the isolating transformers to the operating mechanisms of the switches 24, 24' and 24". One end of the primary windings P and P' of the core and coil assemblies 38 and 39 of isolating transformer 32 is commoned and grounded, and the "open" and "close" signals from source 33 are impressed upon the opposite end of the windings P and P'. Similarly, one end of the secondary windings S and S' of core and coil assemblies 38 and 39 of isolating transformer 32' is commoned and connected to the framework 51 which supports the capacitors 58.

The unbalance detecting protective means for capacitor bank 10 includes a plurality of capacitors 35, 36, and 37 connected between the bank neutral 21 and ground. The capacitors 35 and 36 may be 100 kilovar capacitors of 13.8 kilovolt rating, and capacitor 37 may be a 15 kilovar capacitor of 480 volt rating. The operating coil 40 of a voltage sensitive relay 41 is connected across capacitor 37 by leads 43. Relay 41 has normally open contacts 44 which are connected to energize the trip coil 14 of circuit breaker 12 when the contacts 44 are closed.

Capacitors 35, 36, and 37 constitute a potential divider between bank neutral 21 and ground. Any displacement, or shift, of the voltage of neutral 21 with respect to ground is reflected across each of the capacitors 35, 36, and 37. Capacitors 35, 36, and 37 are preferably selected so that only a minor fraction of the neutral-to-ground voltage appears across capacitor 37 in order to permit use of a capacitor of low insulation rating but which will result in sufficient voltage change across capacitor 37, in the event that one series group is shorted out, to permit relay 41 to detect the shift of neutral voltage and trip the circuit breaker 12. A spark gap 45 is preferably connected across low voltage capacitor 37 and operating coil 40 to assure that they will not be damaged by voltage transients.

The unbalance detecting means of the embodiment illustrated in FIG. 1 eliminates the potential transformer, whereas in the embodiment illustrated in FIG. 1A the primary of a potential transformer 47 is connected across capacitor 37 and the secondary thereof is connected across the operating coil 40 of voltage relay 41. The potential transformer 47 in the embodiment of FIG. 1A can be insulated for only 15 kilovolts, and it will be appreciated that the cost thereof is greatly reduced in comparison to the conventional potential transformer arrangement wherein the potential transformer is connected between neutral and ground and must be of the power system voltage class. Further, the disclosed arrangement obviates the possibility of damage to the capacitor bank as a result of ferroresonance between the potential transformer, the power system, and the capacitor bank during switching and system disturbances as occasionally occurs when the potential transformer is connected between neutral to ground.

With capacitors 35, 36, and 37 connected between bank neutral 21 and ground, the capacitor bank 10 acts as an absorber of surge energy of traveling waves on power line 11, thus providing protection against lightning adn switching surges. Preferably an inexpensive lightning arrester 49 of the 15 kilovolt distribution voltage class is connected between the bank neutral and ground. The groups 20 and 22 offer low impedance to high frequency surges appearing on the lines $\phi_A$, $\phi_B$, and $\phi_C$, and since the capacitors 35, 36, and 37 offer relatively low impedance from neutral to ground, the surge waves are sloped off and their peaks reduced. Consequently, the base impulse insulation level of the base insulators 50, which isolate from ground the metallic framework 51 on which the capacitor units 58 of each phase are mounted, may be substantially reduced, and in the disclosed embodiment base insulators 50 of 15 kilovolt rating may be utilized in comparison to the 34.5 kilovolt base insulators required with floating neutral capacitor banks having unbalance detection protective means utilizing a potential transformer between neutral and ground. The impedance offered by groups 20 and 22 to the flow of follow current permits lightning arrester 49 to be of only the 15 kilovolt distribution class.

In capacitor banks in accordance with the aforementioned U.S. Patent 2,887,647 to Strozier, it may be desirable to connect capacitors across each of the cascaded isolation transformers 32, 32' and 32" in order to distribute the voltage uniformly across the isolation transformers, particularly if the distributed capacitance of the windings of all three transformers 32, 32' and 32" vary and result in unequal voltage across the transformers. In accordance with the invention, the capacitors of the voltage divider between neutral and ground also serve to distribute the voltage uniformly across the isolation transformers 32 and 32'. A conductor 70 connects the junction between capacitors 35 and 36 to the lead 71 connecting the junction between secondary windings S and S' of isolating transformer 32 (see FIG. 2) to the junction between the primary windings P and P' of isolating transformer 32' so that the serial arrangement of capacitors 36 and 37 is, in effect, connected across isolation transformer 32 and capacitor 35 is connected across isolation transformer 32'.

FIG. 3 illustrates the metallic framework 51 on which the capacitors 58 of phase B are mounted and which is isolated from ground by base insulators 50 of only 15 kilovolt rating. Framework 51 includes three superimposed levels, or racks 53, 54 and 55 with the lowest rack 53 separated by insulators 57 from the middle rack 54 and the top rack 55. Each rack 53, 54 and 55 is conventionally constructed of suitable horizontal and vertical structural iron members welded together and supports the six capacitor units 58 which constitute one series group 20 of the first step in two rows at the left end as seen in FIG. 3 and one series group 22 of the second step in a single row at the right end. Each series group 20 and 22 preferably comprises six 100 kilovar, two-bushing capacitor units 58. The switch 24 for each group 22 of the second step is mounted at the right end of the corresponding rack. The capacitors 58 included in the series groups 20 and 22 adjacent the neutral are supported on the lowest rack 53; the capacitors 58 included in the series groups 20″ and 22″ adjacent the power line conductor $\phi_B$ are supported on the top rack 55; and the capacitors 58 of the middle series groups 20′ and 22′ are supported on the middle rack 54. The lowest rack 53 constitutes the floating neutral of capacitor bank 10, and one terminal of the six capacitors 58 constituting group 20 are connected thereto by a conductor 74 (see FIG. 3). The isolation transformer 32″ is mounted on a suitable bracket secured to the lowest rack 53.

Isolation transformers 32 and 32′ which are cascaded to provide neutral-to-ground insulation are mounted on a suitable pedestal 60 separate from framework 51. Isolation transformer 32 nearest to ground is supported on a suitable bracket secured to pedestal 60, and isolation transformer 32′ is mounted on suitable insulators 61 supported on pedestal 60. Capacitors 36 and 37 are supported on suitable brackets 63 secured to pedestal 60, and capacitor 35 and isolation transformer 32′ may be mounted on a suitable bracket 65 which is supported on the insulators 61. The potential transformer 47 of the embodiments of FIG. 1A may be supported on the ground as shown schematically in dotted lines.

While only a few embodiments of the invention have been illustrated and described, many modifications and variations thereof will be apparent to those skilled in the art, and consequently it is intended in the appended claims to cover all such modifications and variations which fall within the true spirit and scope of the invention.

I claim:

1. In combination, a polyphase shunt capacitor bank connected in star to a polyphase power system and having a floating neutral, a plurality of serially arranged capacitors connected between said neutral and ground, and means for detecting unbalance in said capacitor bank connected across one of said serially arranged capacitors, whereby said unbalance detecting means may have a low insulation level.

2. In combination, a capacitor bank connected in shunt to a polyphase power system, a capacitance voltage divider connected between the neutral of said bank and ground, and means for detecting unbalance in the voltages across the phases of said bank, said unbalance detecting means being connected across a portion of said capacitance voltage divider.

3. In combination, a polyphase shunt capacitor bank connected in star to a polyphase power system, a plurality of serially arranged capacitors connected between the neutral of said bank and ground and constituting a potential divider, and means connected across the one serially arranged capacitor nearest to ground for detecting unbalance in the voltages across the phases of said capacitor bank, said capacitor bank with its neutral connected to ground through said serially arranged capacitors absorbing surge energy of traveling waves on said power system.

4. In a polyphase alternating current power system, in combination, a polyphase capacitor bank adapted to be connected to said system in a plurality of steps, each step including a plurality of capacitors in each phase, the capacitors of the first step in each phase being connected in series, means for connecting the serially connected capacitors of the first step in each phase in star to said system, an electrical switch for each capacitor of each succeeding step connected in a series circuit with said capacitor and a capacitor of the first step, means including a plurality of cascaded isolating transformers in each phase for operating the switches of each succeeding step substantially simultaneously, a plurality of serially arranged capacitors connected between the neutral of said star connected bank and ground and constituting a voltage divider, means connected across one of said serially arranged capacitors for detecting unbalance in the voltages across the phases of said capacitor bank, given ones of said serially arranged capacitors being connected across certain of said cascaded isolating transformers and distributing the voltage uniformly across said certain isolating transformers.

5. In combination, a polyphase shunt capacitor bank adapted to be connected in star to a polyphase power system, each phase of said bank including a metallic framework, a plurality of capacitors mounted on said framework, and insulators for isolating said framework from ground; a plurality of capacitors connected in series between the neutral of said star bank and ground, means connected across the one of said serially connected capacitors nearest to ground for detecting unbalance in the voltages across the phases of said capacitor bank, said star capacitor bank having its neutral so connected to ground through said series connected capacitors absorbing surge energy of traveling waves on each power system, whereby the insulation level of said insulators may be reduced.

6. In combination with a polyphase alternating current power system, a polyphase shunt capacitor bank, circuit interrupting means for connecting said capacitor bank in star to said power system, said circuit interrupting means having a trip coil adapted when energized to actuate said circuit interrupting means to disconnect said bank from said system, a capacitance voltage divider connected between the neutral of said bank and ground, means connected across a portion of said voltage divider for detecting unbalance in the voltages across the phases of said bank and including voltage sensitive means adapted when operated to complete an energizing circuit to said trip coil and being operative in response to a predetermined unbalance in the voltages across the phases of said capacitor bank.

7. In the combination defined by claim 6 wherein said voltage divider includes a plurality of series connected capacitors and said unbalance detecting means includes a potential transformer connected across the one of said series connected capacitors nearest to ground.

References Cited by the Examiner
UNITED STATES PATENTS

| | | | |
|---|---|---|---|
| 2,447,658 | 8/1948 | Marbury et al. | 317—12 |
| 2,931,950 | 4/1960 | Minder | 317—12 |
| 2,933,652 | 4/1960 | Auttiro | 317—12 |

SAMUEL BERNSTEIN, *Primary Examiner.*